US009135483B2

(12) United States Patent
Liu et al.

(10) Patent No.: US 9,135,483 B2
(45) Date of Patent: Sep. 15, 2015

(54) TERMINAL HAVING IMAGE DATA FORMAT CONVERSION

(75) Inventors: Yong Liu, Jiangsu (CN); Xiaoxun Zhu, Morristown, NJ (US); Xi Tao, Morristown, NJ (US); Ynjiun Paul Wang, Morristown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 14/342,551

(22) PCT Filed: Sep. 9, 2011

(86) PCT No.: PCT/CN2011/001530
§ 371 (c)(1),
(2), (4) Date: Mar. 4, 2014

(87) PCT Pub. No.: WO2013/033866
PCT Pub. Date: Mar. 14, 2013

(65) Prior Publication Data
US 2014/0197238 A1 Jul. 17, 2014

(51) Int. Cl.
*G06K 7/10* (2006.01)
*G06K 7/14* (2006.01)
(52) U.S. Cl.
CPC ........ *G06K 7/10722* (2013.01); *G06K 7/10544* (2013.01); *G06K 7/1408* (2013.01)

(58) Field of Classification Search
USPC ............................ 235/462.27, 462.24, 462.11
IPC ............. G06K 7/10722,7/14, 7/10811, 7/10851
See application file for complete search history.

(56) References Cited

U.S. PATENT DOCUMENTS

2001/0052939 A1* 12/2001 Riedel .......................... 348/294
2014/0246494 A1* 9/2014 Wang et al. ............... 235/462.07

* cited by examiner

*Primary Examiner* — Karl D Frech
(74) *Attorney, Agent, or Firm* — Additon, Higgins & Pendleton, P.A.

(57) ABSTRACT

There is set forth herein an indicia reading terminal having data format conversion capabilities. The indicia reading terminal includes an image sensor integrated circuit with an image sensor array comprising a plurality of pixels. The image sensor integrated circuit is configured to output image data in a first data format to a data formatting circuit for conversion to image data in a second data format. The data formatting circuit is configured to provide the image data in the second data format to the at least one data interface of a microprocessor integrated circuit, which is operative to transfer image data received by the at least one data interface into memory of the indicia reading terminal. A CPU of the microprocessor integrated circuit is operative for executing a decoding algorithm for processing image data in the memory for attempting to decode at least one symbol represented in the memory.

17 Claims, 3 Drawing Sheets

TERMINAL HAVING IMAGE DATA FORMAT CONVERSION

FIELD OF THE INVENTION

The present invention relates to indicia reading terminals, and more particularly to image data format conversion in indicia reading terminals.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

In imaging based barcode scanning using indicia reading terminals, one method for image acquisition in an embedded system includes using a dedicated camera/video interface integrated into a CPU or microcontroller of the terminal. Another method is to use an image buffer between a camera interface and the CPU or microcontroller. In the latter method, the CPU/microcontroller can read data of an image from the image buffer via, for instance, a parallel memory interface. However, both methods are prohibitive for low-cost scanner solutions because component cost in implementations of these two methods cannot be greatly decreased.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

SUMMARY OF THE INVENTION

Figure 1:
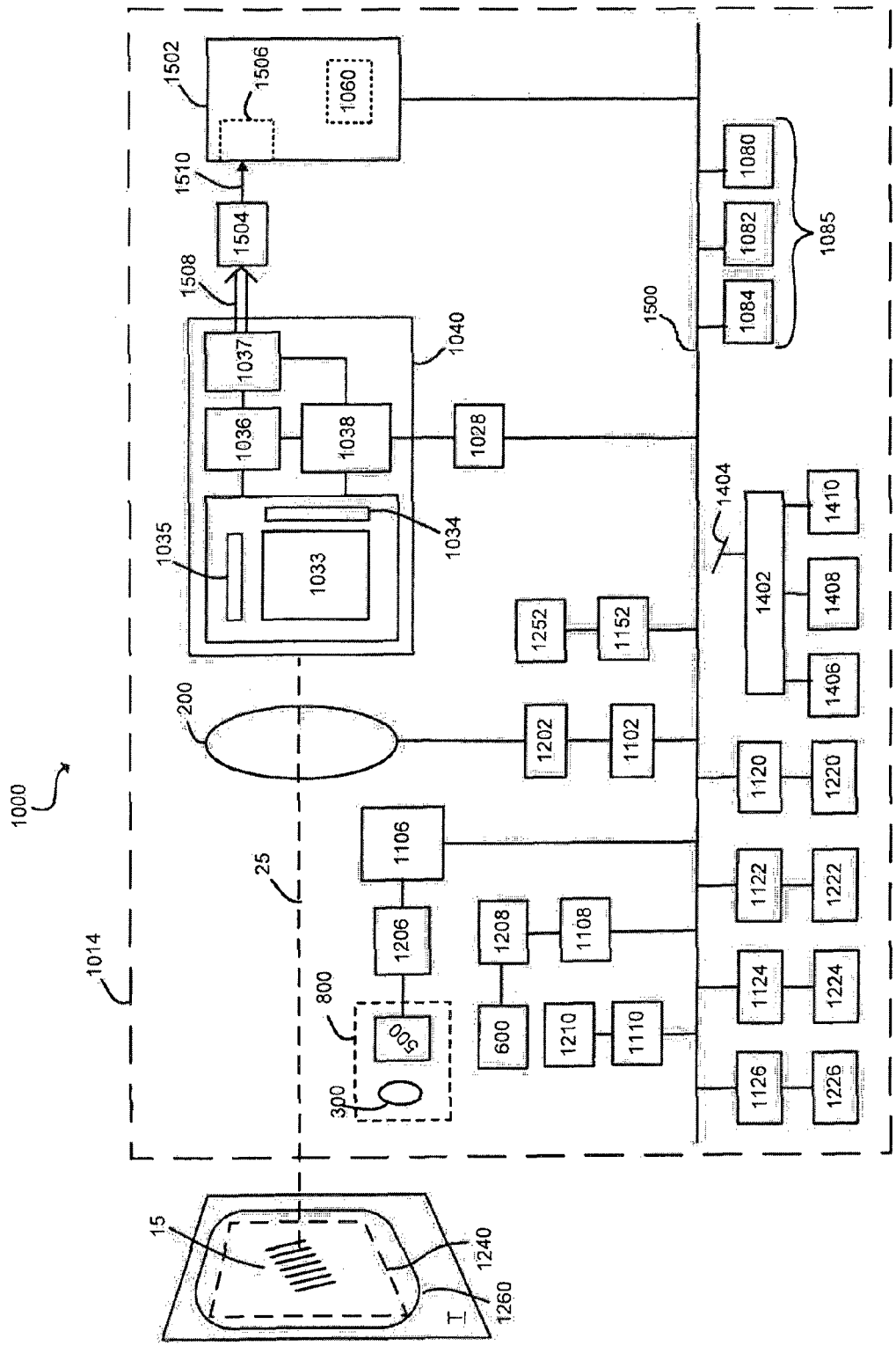
FIG. 1 is one embodiment of a block diagram of an indicia reading terminal in accordance with one or more aspects of the present invention.

The shortcomings of the prior art are overcome and additional advantages are provided through the provision of an indicia reading terminal which includes, for instance, an image sensor integrated circuit, the image sensor integrated circuit including a two-dimensional image sensor array comprising a plurality of selectively-addressable pixels, the image sensor integrated circuit further including analog-to-digital conversion circuitry for converting analog signal pixel values into digital signal pixel values, and the image sensor integrated circuit configured to output image data in a first data format; an imaging lens assembly for focusing an image of a target onto the two-dimensional image sensor array of the image sensor integrated circuit; a memory; a microprocessor integrated circuit, the microprocessor integrated circuit including a central processing unit (CPU) and at least one data interface for receiving data in a second data format, the microprocessor integrated circuit operative to transfer image data received by the at least one data interface into the memory of the indicia reading terminal, and the CPU operative for executing a decoding algorithm, the decoding algorithm for processing image data in the memory for attempting to decode at least one symbol represented in the memory; and a data formatting circuit for receiving image data in the first data format output from the image sensor integrated circuit, for converting the received image data in the first data format to image data in the second data format, and for providing the image data in the second data format to the at least one data interface of the microprocessor integrated circuit.

Additional features and advantages are realized through the concepts of the present invention. Other embodiments and aspects of the invention are described in detail herein and are considered a part of the claimed invention.

DETAILED DESCRIPTION OF THE INVENTION

An exemplary hardware platform for support of operations described herein with reference to an image sensor based indicia reading terminal 1000 is shown and described with reference to FIG. 1.

Indicia reading terminal 1000 can include an image sensor 1032 comprising a multiple pixel image sensor array 1033 having pixels arranged in rows and columns of pixels, along with associated column circuitry 1034 and row circuitry 1035. Associated with image sensor 1032 can be amplifier circuitry 1036 (amplifier), and an analog-to-digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, and gain applied to amplifier 1036. The noted circuit components 1032, 1036, 1037, and 1038 can be packaged into a common image sensor integrated circuit 1040. Image sensor integrated circuit 1040 can, in some embodiments, incorporate fewer than the noted number of components. In one example, image sensor integrated circuit 1040 can be provided e.g., by an MT9V022 (752×480 pixel array), an MT9V023 (752×480 pixel array), or an MT9M114 (1296× 976 pixel array) image sensor integrated circuit available from Micron Technology, Inc. In another example, image sensor integrated circuit 1040 can be provided e.g., by a CM8237-A030SF-E (640×480) image sensor integrated circuit available from Truly Semiconductors Ltd. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at image sensor array 1033 are red pixels at red pixel positions, green pixels at green pixel positions, and blue pixels at blue pixel positions. In the example of an image sensor array incorporating a Bayer pattern filter, frames that are provided can include red pixel values at red pixel positions, green pixel values at green pixel positions, and blue pixel values at blue pixel positions. Further in an embodiment incorporating a Bayer pattern image sensor array, CPU 1060, described in further detail below, can, prior to subjecting a frame to further processing, interpolate pixel values at frame pixel positions intermediate of green pixel positions utilizing green pixel values for development of a monochrome frame of image data. Alternatively, CPU 1060 can, prior to subjecting a frame for further processing, interpolate pixel values intermediate of red pixel positions utilizing red pixel values for development of a monochrome frame of image data. CPU 1060 can, alternatively, prior to subjecting a frame for further processing, interpolate pixel values intermediate of blue pixel positions utilizing blue pixel values. An imaging subsystem of terminal 1000 can include image sensor 1032 and a lens assembly 200 for focusing an image onto image sensor array 1033 of image sensor 1032.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include a microprocessor integrated circuit 1502 that includes CPU 1060 which can be adapted to read out image data stored in memory 1080 and subject such image data to various image processing algorithms. Terminal 1000 can also include a data formatting circuit 1504 for routing image information read out from image sensor integrated circuit 1040 to microprocessor integrated circuit 1502 for storage in RAM 1080. A skilled artisan will appreciate that other embodiments of the system bus architecture for efficient data transfer between image sensor 1032 and RAM 1080 are within the scope and the spirit of the invention.

Referring to further aspects of terminal 1000, imaging lens assembly 200 can be adapted for focusing an image of decodable indicia 15 located within a field of view 1240 on a substrate, T, onto image sensor array 1033. A size in target space of a field of view 1240 of terminal 1000 can be varied in a number of alternative ways. A size in target space of a field of view 1240 can be varied, e.g., by changing a terminal-to-target distance, changing an imaging lens assembly setting, and/or changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Figure 3:
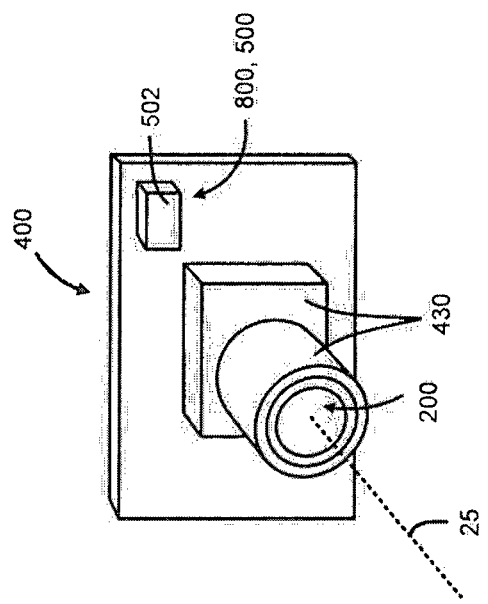
FIG. 3 is a perspective view of an imaging module.
Figure 2:
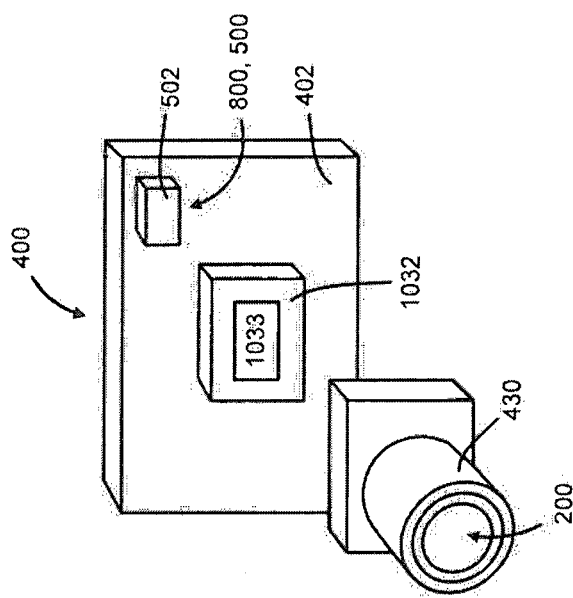
FIG. 2 is an exploded assembly perspective view of an imaging module.

Terminal 1000 can include an illumination subsystem 800 for illumination of target, T, and projection of an illumination pattern 1260. Illumination pattern 1260, in the embodiment shown, can be projected to be proximate to, but larger than, an area defined by field of view 1240, and/or can also be projected in an area smaller than an area defined by a field of view 1240. Illumination subsystem 800 can include a light source bank 500, comprising one or more light sources. A physical form view of an example of an illumination subsystem is shown in FIGS. 2 and 3. As shown in FIGS. 2 and 3, an imaging module 400 can be provided having a circuit board 402 carrying image sensor 1032 and lens assembly 200 disposed in support 430 disposed on circuit board 402. In the embodiment of FIGS. 2 and 3, illumination subsystem 800 has a light source bank 500 provided by single light source 502. In another embodiment, light source bank 500 can be provided by more than one light source.

Referring back to FIG. 1, terminal 1000 can also include an aiming subsystem 600 for projecting an aiming pattern (not shown). Aiming subsystem 600, which can comprise a light source bank, can be coupled to aiming light source bank power input unit 1208 for providing electrical power to a light source bank of aiming subsystem 600. Power input unit 1208 can be coupled to system bus 1500 via interface 1108 for communication with other components of terminal 1000, such as microprocessor integrated circuit 1502 and/or CPU 1060 thereof.

In one embodiment, illumination subsystem 800 can include, in addition to light source bank 500, an illumination lens assembly 300, as is shown in the embodiment of FIG. 1. In addition to, or in place of, illumination lens assembly 300, illumination subsystem 800 can include alternative light shaping optics, e.g. one or more diffusers, mirrors and prisms.

In use, terminal 1000 can be oriented by an operator with respect to a target, T, (e.g., a piece of paper, a package, another type of substrate) bearing decodable indicia 15 in such manner that illumination pattern 1260 is projected on decodable indicia 15. In the example of FIG. 1, decodable indicia 15 are provided by a 1D bar code symbol. Decodable indicia 15 could also be provided by a 2D bar code symbol or optical character recognition (OCR) characters.

Referring to further aspects of terminal 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that, in response to activation of a trigger signal, a succession of frames can be captured by way of read out of image information from image sensor array 1033 (typically, though not always, in the form of analog signals) and then storage of the image information after conversion into memory 1080 (which can buffer one or more of the succession of frames at a given time). Microprocessor integrated circuit 1502 can be operative to subject one or more of the succession of frames to a decode attempt, for instance by CPU 1060 of microprocessor integrated circuit 1502.

In attempting to decode a bar code symbol, e.g., a one dimensional bar code symbol, microprocessor integrated circuit 1502 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. In one particular embodiment, CPU 1060 of microprocessor integrated circuit 1502 performs such processing of image data. Where a decodable indicia representation is a 2D bar code symbology, a decode attempt can include locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with microprocessor integrated circuit 1502, which is also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Terminal 1000 can also include a display 1222 coupled to system bus 1500 and in communication with microprocessor integrated circuit 1502 (for instance CPU 1060 thereof), via interface 1122, as well as pointer mechanism 1224 in communication with microprocessor integrated circuit 1502 (for instance CPU 1060 thereof) via interface 1124 connected to system bus 1500. Terminal 1000 can additionally include keyboard 1226 coupled to system bus 1500 via interface 1126. Terminal 1000 can also include range detector unit 1210 coupled to system bus 1500 via interface 1110. In one embodiment, range detector unit 1210 can be an acoustic range detector unit.

Terminal 1000 can additionally include an accelerometer 1252 which can be coupled to system bus 1500 for communication across bus 1500 with microprocessor integrated circuit 1502, and/or CPU 1060 thereof, via interface 1152. Terminal 1000 can monitor an output of accelerometer 1252 for determining a measure of motion of terminal 1000. Terminal 1000 can also compare pixel values of successive frames for determining a measure of motion of terminal 1000 (with an increase in motion the pixel values of corresponding pixel positions of successive frames can be expected to increase).

Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Figure 4:
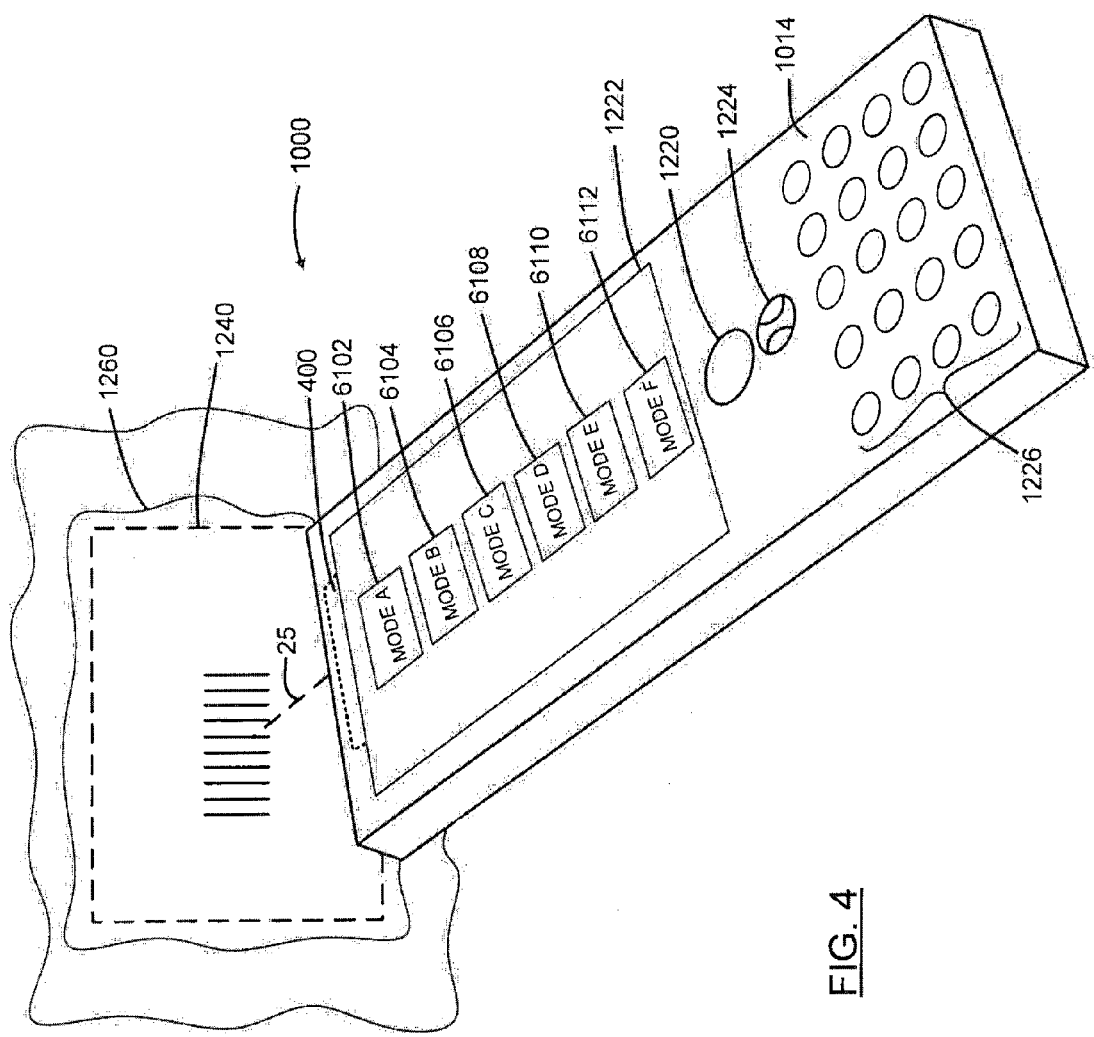
FIG. 4 is a schematic physical form view of an indicia reading terminal in particular one embodiment of the present invention.

Further aspects of terminal 1000 in one embodiment are described with reference again to FIG. 4. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. Terminal 1000 can be operative so that user-selectable modes of operation are selectable with use of displayed actuators 6102, 6104, . . . , 6112, or with use of programming bar code symbols. A hand held housing 1014 for terminal 1000 can, in another embodiment, be devoid of a display and/or keyboard and can be in a gun style form factor. Additionally, imaging module 400, including image sensor array 1033 and imaging lens assembly 200 can be incorporated in hand held housing 1014.

Referring back to FIG. 1, in accordance with aspects of the present invention, data format conversion is provided. Image sensor integrated circuit 1040 is configured to output image data in a first format, while microprocessor integrated circuit 1502 is configured to receive image data in a second data format. In operation of terminal 1000, image data in a first data format is output, for instance during a decode attempt as described above, from image sensor integrated circuit 1040. In the example described above, image signals (such as analog signal pixel values) are supplied to analog-to-digital converter 1037, which converts the analog signal pixel values to digital signal pixel values for output by image sensor integrated circuit 1040. Image sensor integrated circuit 1040 can then output this data for processing. In one example, image data output by the image sensor integrated circuit comprises parallel data, where, in parallel data format, one pixel of data is transmitted per clock cycle—that is, the multiple-bit representation (e.g. 8-bit, 10-bit, 12-bit) of the pixel signal is read-out per pixel clock cycle.

Additionally, microprocessor integrated circuit 1502 comprises at least one data interface 1506 for receiving data in a second image format. In one particular example, the at least one data interface 1506 includes a serial data interface for receiving data in a serial data format. In serial data format, in contrast to a parallel data format, serial data is transmitted at one bit per pixel clock cycle. Thus, the multiple-bit representation of the pixel signal is read-out across a number of pixel clock cycles, which number corresponds to the number of bits representing the single pixel signal. After microprocessor integrated circuit 1502 receives the image data, e.g. in the second data format, it can transfer the data to a memory, such as RAM 1080, for further processing, as described above.

As noted, image sensor integrated circuit 1040 outputs image data in a first format, which may be different from the format in which microprocessor integrated circuit 1502 is configured to receive image data by way of the at least one data interface 1506 thereof. Thus, in accordance with an aspect of the present invention, terminal 1000 additionally includes a data formatting circuit 1504. Data formatting circuit 1504 receives image data from the image sensor integrated circuit 1040 in the first data format, for instance via bus 1508. Data formatting circuit 1504 converts this received image data in the first format, which is received from the image sensor integrated circuit 1040, to image data in the second data format. This converted image data, which is now in the second data format, can be provided to the at least one data interface 1506 of the microprocessor integrated circuit 1502. Thus, data formatting circuit 1504 enables interfacing between image sensor integrated circuit 1040 and microprocessor integrated circuit 1502, which advantageously facilitates interfacing these two components despite their having incompatible I/O data formats. In one specific example, data formatting circuit 1504 comprises a complex programmable logic device (CPLD). Alternatively, data formatting circuit 1504 may be implemented using any suitable means recognizable to those having ordinary skill in the art.

The first data format can comprise a parallel data format in which data is provided in parallel, while the second data format can comprise a serial data format in which data is provided serially. In the example where the first data format comprises a parallel data format and the second data format comprises a serial data format, image sensor integrated circuit 1040 outputs parallel data to data formatting circuit 1504. Data formatting circuit 1504 receives the parallel (in this example) data, converts the parallel data to serial data, providing the data serially to microprocessor integrated circuit 1502 (e.g. by way of bus 1510). More particularly, data formatting circuit 1504 can provide the serial data to the at least one data interface 1506 of microprocessor integrated circuit 1502.

The present invention can provide data format conversion between many different data formats. For instance, the first data format may comprise a mobile industry processor interface (MIPI) data format. Additionally or alternatively, the second data format can comprise a serial peripheral interface bus (SPI) format, a universal asynchronous receiver/transmitter (UART) format, or an Inter-integrated circuit (I²C) format, or any combination of the foregoing. Those having ordinary skill in the art will recognize that the present invention can be employed with many other data formats not specifically mentioned herein.

In a further aspect of the present invention, terminal 1000 is configured with multiple modes of operation and terminal 1000 is selectably configurable, for instance by a user thereof, to operate in one or more of the multiple modes. For instance, one or more of actuators 6102, . . . , 6112, and/or one or more keys of keyboard 1226 may be engaged to select a mode of operation of the multiple modes of operation in which terminal 1000 should be configured to operate.

Different modes of operation can be associated with different picture sizes at which image sensor integrated circuit 1040 operates to obtain images. Picture size refers to a number of picture elements (pixels) being read-out. The greater the number of pixels being read-out, the larger the picture size. Picture size is contrasted with resolution in that resolution refers to the number of pixels (or lines of pixels) per unit of frame area. In this regard, an image of an entire frame in which every other pixel is read-out has the same picture size of an image comprising every pixel of the bottom half of a frame, since the same number of pixels are read-out, but the latter image will have a greater resolution because of the greater pixel density being read-out.

Generally, the smaller the picture size, the less data that is required to be processed (e.g. read-out, stored, processed, etc.). When less data is being processed, pixel data can be read-out (e.g. from the image sensor array) at a faster pixel clock speed. Conversely, when images of larger picture size are obtained, comparatively more data is required to be processed, and a slower pixel clock speed can be used to read-out pixel data.

In this regard, indicia reading terminal 1000 may be configured to operate in any one of multiple modes of operation, with each mode being associated with capture of a frame of image data at a different picture size and different pixel clock speed. For instance, in a first mode of operation, the image sensor integrated circuit of indicia reading terminal 1000 may be operative to read-out image signals for capture of a frame of image data having a relatively large picture size from the image sensor array (for instance a full frame), and the indicia reading terminal reads-out the image signals at a relatively slow (lower) pixel clock speed. The image signals, after being read-out and stored as image data in memory, can be subject to further processing such as described above. In one particular embodiment, in this first mode of operation, a common pixel clock speed may be utilized for read-out of each row of pixel values included in a frame that is read-out. This particular mode of operation may be advantageous when image accuracy and detail is a priority, such as when obtaining a full frame photograph of the target. In a further enhancement, when this slow pixel read-out mode is selected, the frames may be subjected to image data file formatting for formatting the image data in a particular file format. In this regard, frame image file formatting processing can be active in this picture taking mode but not active in other modes, such as a decode mode described below. A non-limiting list of example image file formats for storing photographic image data obtained in this first mode of operation includes JPEG, Bitmap (BMP), Portable Network Graphics (PNG), Graphics Interchange Format (GIF), raw image format (RAW), Exchangeable image file format (Exit), and Tagged Image File Format (TIFF).

In a second mode of operation, the image sensor integrated circuit of indicia reading terminal 1000 may be operative to read-out image signals for capture of a frame of image data having a smaller picture size from the image sensor array, and the indicia reading terminal reads-out the image signals at a relatively fast (higher) pixel clock speed. Various techniques can be employed to obtain a smaller picture size than, for instance, a full frame picture size. For instance, in one embodiment, data can be read-out from the image sensor array at a lower resolution than a full frame of pixels of the image sensor array. In one example, reading-out at a lower resolution comprises reading every N-th pixel, where N>1 (such as every other pixel). Alternatively or additionally, in the second mode of operation, one or more windowed frames comprising pixel values corresponding to less than a full frame of pixels, for instance a sub-set of pixels, of image sensor array are read-out from the image sensor array. In one particular example, a windowed frame is read-out that is centered at a set pixel of the image sensor array, which set pixel may be a center pixel of the image sensor array or any other pixel thereof. Alternatively, a windowed frame could comprise a linear arrangement of pixels of the image sensor array. With respect to this latter windowing technique, a significant number of barcodes comprise 1-dimensional indicia, meaning a narrow slice (window) that spans the barcode may provide a sufficient read-out to decode the barcode. Therefore, this second mode of operation may be advantageously employed in barcode scanning to enable relatively fast scanning by way of the faster pixel clock speed.

Thus, in accordance with one or more aspects of the present invention, in a first mode of operation, where the first mode of operation is active, image sensor integrated circuit 1040 is operative to capture a frame of image data having a first picture size, responsive to a trigger signal activation, and terminal 1000 reads-out the image signals at a first pixel clock speed. Additionally, in a second mode of operation, where the second mode of operation is active, the image sensor integrated circuit is operative to capture a frame of image data having a second picture size, and the terminal 1000 reads-out the image signals at a first pixel clock speed.

Provided below is a table identifying examples of commercial parts suitable for image sensor integrated circuit 1040, data formatting circuit 1504, and microprocessor integrated circuit 1502:

| Element # | Part # (or Part Family) | Provider |
|---|---|---|
| 1040 (FIG. 1) | CM8237-A030SF-E | Truly Semiconductors Ltd. |
| 1502 (FIG. 1) | MT9M114 | Aptima Imaging Corp. |
| 1502 (FIG. 1) | PIC32MX5XX/6XX/7XX | Microchip Technologies Inc. |
| 1504 (FIG. 1) | CoolRunner XPLA3 CPLD | XILINX Inc. |

A small sample of systems methods and apparatus that are described herein is as follows:

A1. An indicia reading terminal comprising: an image sensor integrated circuit, the image sensor integrated circuit including a two-dimensional image sensor array comprising a plurality of selectively-addressable pixels, the image sensor integrated circuit further including analog-to-digital conversion circuitry for converting analog signal pixel values into digital signal pixel values, and the image sensor integrated circuit configured to output image data in a first data format; an imaging lens assembly for focusing an image of a target onto the two-dimensional image sensor array of the image sensor integrated circuit; a memory; a microprocessor integrated circuit, the microprocessor integrated circuit comprising a central processing unit (CPU) and at least one data interface for receiving data in a second data format, the microprocessor integrated circuit operative to transfer image data received by the at least one data interface into the memory of the indicia reading terminal, and the CPU operative for executing a decoding algorithm, the decoding algorithm for processing image data in the memory for attempting to decode at least one symbol represented in the memory; and a data formatting circuit for receiving image data in the first data format output from the image sensor integrated circuit, for converting the received image data in the first data format to image data in the second data format, and for providing the image data in the second data format to the at least one data interface of the microprocessor integrated circuit.

A2. The indicia reading terminal of A1, wherein the second data format comprises a serial data format.

A3. The indicia reading terminal of A2, wherein the at least one data interface comprises at least one serial data interface for receiving data in the serial data format.

A4. The indicia reading terminal of A2, wherein the first data format comprises a parallel data format, wherein the data formatting circuit receives image data in the parallel data format and converts the received image data in the parallel data format to image data in the serial data format for providing to the at least one data interface of the microprocessor integrated circuit.

A5. The indicia reading terminal of A2, wherein the first data format comprises a mobile industry processor interface (MIPI) data format, and wherein the data formatting circuit receives image data in the MIPI data format and converts received image data in the MIPI data format to image data in the serial data format for providing to the at least one data interface of the microprocessor integrated circuit A6. The indicia reading terminal of A2, wherein the serial data format comprises at least one of a serial peripheral interface bus (SPI) format, a universal asynchronous receiver/transmitter (UART) format, or an Inter-integrated circuit ($I^2C$) format A7. The indicia reading terminal of A1, wherein the indicia reading terminal has a first mode of operation and a second mode of operation, and wherein:

responsive to a trigger signal activation with the first mode of operation active, image signals are read out from the image sensor array for capture of a frame of image data having a first picture size and the indicia reading terminal reads-out the image signals at a first pixel clock speed for processing the image data; and responsive to a trigger signal activation with the second mode of operation active, image signals are read out from the image sensor array for capture of a frame of image data having a second picture size and the indicia reading terminal reads-out the image signals at a second pixel clock speed, wherein the first picture size is larger than the second picture size and wherein the first pixel clock speed is slower than the second pixel clock speed.

A8. The indicia reading terminal of A7, wherein each row of pixel values included in image data of a frame is read-out at a common pixel clock speed.

A9. The indicia reading terminal of A7, wherein in the second mode of operation, the indicia reading terminal reads-out pixel data at a lower resolution than a full frame of pixels of the image sensor array.

A10. The indicia reading terminal of A7, wherein in the second mode of operation, the indicia reading terminal reads-out one or more windowed frames from the image sensor array.

A11. The indicia reading terminal of A10, wherein the one or more windowed frames comprises at least one of: a windowed frame centered at a set pixel of the image sensor array, and a linear arrangement of pixels of the image sensor array.

A12. The indicia reading terminal of A7, wherein the indicia reading terminal is selectably configurable by a user of the indicia reading terminal to operate in one of the first mode of operation or the second mode of operation.

A13. The indicia reading terminal of A7, wherein the first mode of operation comprises a photographing mode.

A14. The indicia reading terminal of A7, wherein the second mode of operation comprises a barcode scanning mode.

A15. The indicia reading terminal of A1, wherein the data formatting circuit comprises a complex programmable logic device (CPLD).

A16. An indicia reading terminal comprising a two-dimensional image sensor array comprising a plurality of pixels, wherein the indicia reading terminal is selectively configurable to operate in a first mode of operation and a second mode of operation, wherein responsive to a trigger signal activation with the first mode of operation active, image signals are read out from the image sensor array for capture of a frame of image data having a first picture size and the indicia reading terminal reads-out the image signals at a first pixel clock speed, and wherein responsive to a trigger signal activation with the second mode of operation active, image signals are read out from the image sensor array for capture of a frame of image data having a second picture size and the indicia reading terminal reads-out the image signals at a second pixel clock speed, wherein the first picture size is larger than the second picture size and wherein the first pixel clock speed is slower than the second pixel clock speed.

A17. The indicia reading terminal of A16, wherein the first pixel clock speed is uniformly applied for reading-out image signals for capture of the frame of image data having the first picture size, and wherein the second pixel clock speed is uniformly applied for reading-out image signals for capture of the frame of image data having the second picture size.

A18. The indicia reading terminal of A16, wherein the pixels of the image sensor array from which the image signals are read-out are selectively addressable for image signal read-out.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

What is claimed is:

1. An indicia reading terminal comprising:
an image sensor integrated circuit, the image sensor integrated circuit including a two-dimensional image sensor array comprising a plurality of selectively-addressable pixels, the image sensor integrated circuit further including analog-to-digital conversion circuitry for converting analog signal pixel values into digital signal pixel values, and the image sensor integrated circuit configured to output image data in a first data format;
an imaging lens assembly for focusing an image of a target onto the two-dimensional image sensor array of the image sensor integrated circuit;
a memory;
a microprocessor integrated circuit, the microprocessor integrated circuit comprising a central processing unit (CPU) and at least one data interface for receiving data in a second data format, the microprocessor integrated circuit operative to transfer image data received by the at least one data interface into the memory of the indicia reading terminal, and the CPU operative for executing a decoding algorithm, the decoding algorithm for processing image data in the memory for attempting to decode at least one symbol represented in the memory; and
a data formatting circuit for receiving image data in the first data format output from the image sensor integrated circuit, for converting the received image data in the first data format to image data in the second data format, and for providing the image data in the second data format to the at least one data interface of the microprocessor integrated circuit;
wherein the indicia reading terminal has a first mode of operation and a second mode of operation;
wherein responsive to a trigger signal activation with the first mode of operation active, image signals are read out from the image sensor array for capture of a frame of image data having a first picture size and the indicia reading terminal reads-out the image signals at a first pixel clock speed for processing the image data; and
wherein responsive to a trigger signal activation with the second mode of operation active, image signals are read out from the image sensor array for capture of a frame of image data having a second picture size and the indicia reading terminal reads-out the image signals at a second pixel clock speed, wherein the first picture size is larger than the second picture size and wherein the first pixel clock speed is slower than the second pixel clock speed.

2. The indicia reading terminal of claim 1, wherein the second data format comprises a serial data format.

3. The indicia reading terminal of claim 2, wherein the at least one data interface comprises at least one serial data interface for receiving data in the serial data format.

4. The indicia reading terminal of claim 2, wherein the first data format comprises a parallel data format, wherein the data formatting circuit receives image data in the parallel data format and converts the received image data in the parallel data format to image data in the serial data format for providing to the at least one data interface of the microprocessor integrated circuit.

5. The indicia reading terminal of claim 2, wherein the first data format comprises a mobile industry processor interface (MIPI) data format, and wherein the data formatting circuit receives image data in the MIPI data format and converts received image data in the MIPI data format to image data in the serial data format for providing to the at least one data interface of the microprocessor integrated circuit.

6. The indicia reading terminal of claim 2, wherein the serial data format comprises at least one of a serial peripheral interface bus (SPI) format, a universal asynchronous receiver/transmitter (UART) format, or an Inter-integrated circuit (I²C) format.

7. The indicia reading terminal of claim 1, wherein each row of pixel values included in image data of a frame is read-out at a common pixel clock speed.

8. The indicia reading terminal of claim 1, wherein in the second mode of operation, the indicia reading terminal reads-out pixel data at a lower resolution than a full frame of pixels of the image sensor array.

9. The indicia reading terminal of claim 1, wherein in the second mode of operation, the indicia reading terminal reads-out one or more windowed frames from the image sensor array.

10. The indicia reading terminal of claim 9, wherein the one or more windowed frames comprises at least one of: a windowed frame centered at a set pixel of the image sensor array, and a linear arrangement of pixels of the image sensor array.

11. The indicia reading terminal of claim 1, wherein the indicia reading terminal is selectably configurable by a user of the indicia reading terminal to operate in one of the first mode of operation or the second mode of operation.

12. The indicia reading terminal of claim 1, wherein the first mode of operation comprises a photographing mode.

13. The indicia reading terminal of claim 1, wherein the second mode of operation comprises a barcode scanning mode.

14. The indicia reading terminal of claim 1, wherein the data formatting circuit comprises a complex programmable logic device (CPLD).

15. An indicia reading terminal comprising a two-dimensional image sensor array comprising a plurality of pixels, wherein the indicia reading terminal is selectively configurable to operate in a first mode of operation and a second mode of operation, wherein responsive to a trigger signal activation with the first mode of operation active, image signals are read out from the image sensor array for capture of a frame of image data having a first picture size and the indicia reading terminal reads-out the image signals at a first pixel clock speed, and wherein responsive to a trigger signal activation with the second mode of operation active, image signals are read out from the image sensor array for capture of a frame of image data having a second picture size and the indicia reading terminal reads-out the image signals at a second pixel clock speed, wherein the first picture size is larger than the second picture size and wherein the first pixel clock speed is slower than the second pixel clock speed.

16. The indicia reading terminal of claim 15, wherein the first pixel clock speed is uniformly applied for reading-out image signals for capture of the frame of image data having the first picture size, and wherein the second pixel clock speed is uniformly applied for reading-out image signals for capture of the frame of image data having the second picture size.

17. The indicia reading terminal of claim 15, wherein the pixels of the image sensor array from which the image signals are read-out are selectively addressable for image signal read-out.

* * * * *